US008886557B2

(12) United States Patent
Shahbazi et al.

(10) Patent No.: US 8,886,557 B2
(45) Date of Patent: Nov. 11, 2014

(54) CHANGE-BASED TRANSACTIONS FOR AN ELECTRONIC KIOSK

(75) Inventors: Hamed Shahbazi, West Vancouver (CA); Chris Ericksen, Vancouver (CA); Roy Goncalves, New Westminster (CA)

(73) Assignee: TIO Networks Corp., Vancouver, British Columbia (CA)

( * ) Notice: Subject to any disclaimer, the term of this patent is extended or adjusted under 35 U.S.C. 154(b) by 1195 days.

(21) Appl. No.: 11/172,379

(22) Filed: Jun. 29, 2005

(65) Prior Publication Data

US 2006/0036501 A1    Feb. 16, 2006

Related U.S. Application Data

(60) Provisional application No. 60/584,736, filed on Jun. 30, 2004.

(51) Int. Cl.
| | | |
|---|---|---|
| *G06Q 20/00* | (2012.01) | |
| *G06Q 30/00* | (2012.01) | |
| *G07F 19/00* | (2006.01) | |
| *G06Q 20/10* | (2012.01) | |
| *G06Q 20/20* | (2012.01) | |
| *G06Q 30/06* | (2012.01) | |
| *G07F 5/24* | (2006.01) | |

(52) U.S. Cl.
CPC .............. *G07F 19/20* (2013.01); *G06Q 20/10* (2013.01); *G06Q 20/20* (2013.01); *G06Q 30/0601* (2013.01); *G07F 5/24* (2013.01); *G07F 19/203* (2013.01)
USPC ............................ 705/16; 705/27.1; 705/26.8

(58) Field of Classification Search
USPC .......................................... 705/26, 5, 31, 1.1
See application file for complete search history.

(56) References Cited

U.S. PATENT DOCUMENTS

| | | | | |
|---|---|---|---|---|
| 5,937,394 | A | * | 8/1999 | Wong et al. ...................... 705/26 |
| 6,088,682 | A | * | 7/2000 | Burke ............................ 705/17 |
| 6,813,609 | B2 | * | 11/2004 | Wilson ........................... 705/14 |
| 6,876,971 | B1 | * | 4/2005 | Burke ............................. 705/1 |
| 7,020,541 | B2 | * | 3/2006 | Wilson .......................... 700/223 |
| 7,027,890 | B2 | * | 4/2006 | Wilson .......................... 700/232 |
| 7,171,370 | B2 | * | 1/2007 | Burke ............................. 705/1 |
| 7,289,877 | B2 | * | 10/2007 | Wilson .......................... 700/232 |
| 2001/0056376 | A1 | | 12/2001 | Walker et al. |
| 2002/0046121 | A1 | | 4/2002 | Walker et al. |
| 2002/0046124 | A1 | | 4/2002 | Alderucci et al. |
| 2002/0077969 | A1 | | 6/2002 | Walker et al. |
| 2002/0111867 | A1 | * | 8/2002 | Walker et al. ................. 705/14 |
| 2002/0133426 | A1 | | 9/2002 | Walker et al. |
| 2002/0133428 | A1 | * | 9/2002 | Mori et al. ...................... 705/26 |
| 2002/0161653 | A1 | * | 10/2002 | Walker et al. ................. 705/22 |
| 2003/0027635 | A1 | | 2/2003 | Walker et al. |
| 2003/0040927 | A1 | * | 2/2003 | Sato et al. ........................ 705/1 |
| 2003/0083936 | A1 | | 5/2003 | Mueller et al. |
| 2003/0105664 | A1 | | 6/2003 | Van Luchene |
| 2003/0164398 | A1 | | 9/2003 | Walker et al. |
| 2003/0204444 | A1 | | 10/2003 | Van Luchene et al. |
| 2004/0005919 | A1 | | 1/2004 | Walker et al. |
| 2004/0015423 | A1 | | 1/2004 | Walker et al. |

(Continued)

*Primary Examiner* — Seye Iwarere
(74) *Attorney, Agent, or Firm* — HolzerIPLaw, PC

(57) ABSTRACT

A variety of products and services can be integrated into and offered for purchase by an electronic kiosk. An electronic kiosk can accept funds for an initial transaction and the can apply any resulting amount of change from the initial transaction to a second transaction. The transactions can involve products and services and can be amount-based transactions or account-based transactions.

23 Claims, 8 Drawing Sheets

(56) References Cited

U.S. PATENT DOCUMENTS

| | | | |
|---|---|---|---|
| 2004/0024666 A1 | 2/2004 | Walker et al. | |
| 2004/0029630 A1 | 2/2004 | Walker et al. | |
| 2004/0032083 A1* | 2/2004 | Walker et al. | 273/269 |
| 2004/0093271 A1 | 5/2004 | Walker et al. | |
| 2004/0127277 A1 | 7/2004 | Walker et al. | |
| 2004/0138953 A1 | 7/2004 | Van Luchene et al. | |
| 2004/0140352 A1 | 7/2004 | Walker et al. | |
| 2004/0177004 A1 | 9/2004 | Mueller et al. | |
| 2004/0199425 A1 | 10/2004 | Van Luchene et al. | |
| 2004/0249711 A1* | 12/2004 | Walker et al. | 705/14 |
| 2005/0014551 A1 | 1/2005 | Packes et al. | |
| 2005/0014552 A1 | 1/2005 | Packes et al. | |
| 2005/0080737 A1* | 4/2005 | Stein et al. | 705/42 |
| 2005/0098625 A1 | 5/2005 | Walker et al. | |
| 2005/0171848 A1 | 8/2005 | Walker et al. | |
| 2005/0182678 A1 | 8/2005 | Walker et al. | |
| 2005/0187656 A1 | 8/2005 | Walker et al. | |
| 2006/0026014 A1* | 2/2006 | Bolduc et al. | 705/1 |
| 2006/0080198 A1* | 4/2006 | Doyle | 705/35 |

* cited by examiner

CHANGE-BASED TRANSACTIONS FOR AN ELECTRONIC KIOSK

CROSS-REFERENCE TO RELATED APPLICATIONS

This application claims benefit of U.S. Provisional Application No. 60/584,736, entitled "Change-based Transactions for an Electronic Kiosk" and filed on Jun. 30, 2004, which is specifically incorporated herein by reference for all that it discloses and teaches.

TECHNICAL FIELD

The invention relates generally to computer systems, and more particularly to change-based transactions for electronic kiosks.

BACKGROUND

Electronic kiosks primarily provide a specially-targeted product or service. For example, a movie ticket kiosk can sell movie tickets at a theater. Likewise, an Internet kiosk can provide pay-as-you-go Internet access at airports and malls. Purchases through such kiosks are often made using a credit card. Generally, kiosks can provide automated service to consumers and minimize labor costs for the service provider.

However, many consumers do not have credit cards and, therefore, kiosks that accept currency can service individuals that cannot pay by credit card. Some kiosks can accept both credit cards and currency. Nevertheless, for cost reasons, many kiosks do not include or use coin acceptors or dispensers or even paper currency dispensers. Therefore, when a transaction involves currency, a problem can arise when the amount of currency input to the kiosk exceeds the price of the product or service purchased—what can be done with the resulting "change" amount? Existing kiosks fail to provide an adequate solution to this problem. For example, in one approach, the kiosk does not dispense any change whatsoever and the consumer loses the entire change amount.

SUMMARY

Implementations described and claimed herein address the foregoing problems by integrating a variety of products and services in an electronic kiosk and managing the allocation of a change amount from one transaction to other transactions. The transactions can involve products and services and can include amount-based transactions or account-based transactions. Amount-based transactions include transactions for products and services in which the cost of the product or service is pre-defined (e.g., a ten dollar long distance calling card). Account-based transactions include transactions associated with an account in which funds can be deposited and a balance can be carried forward (e.g., a local telephone account wherein a consumer can pay the total monthly bill each month or they can pay more than the bill and the over payment is carried forward to be applied against next month's bill) or merely added to a variable account balance (e.g., added to a stored value card or other account balance).

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

BRIEF DESCRIPTIONS OF THE DRAWINGS

Figure 4:
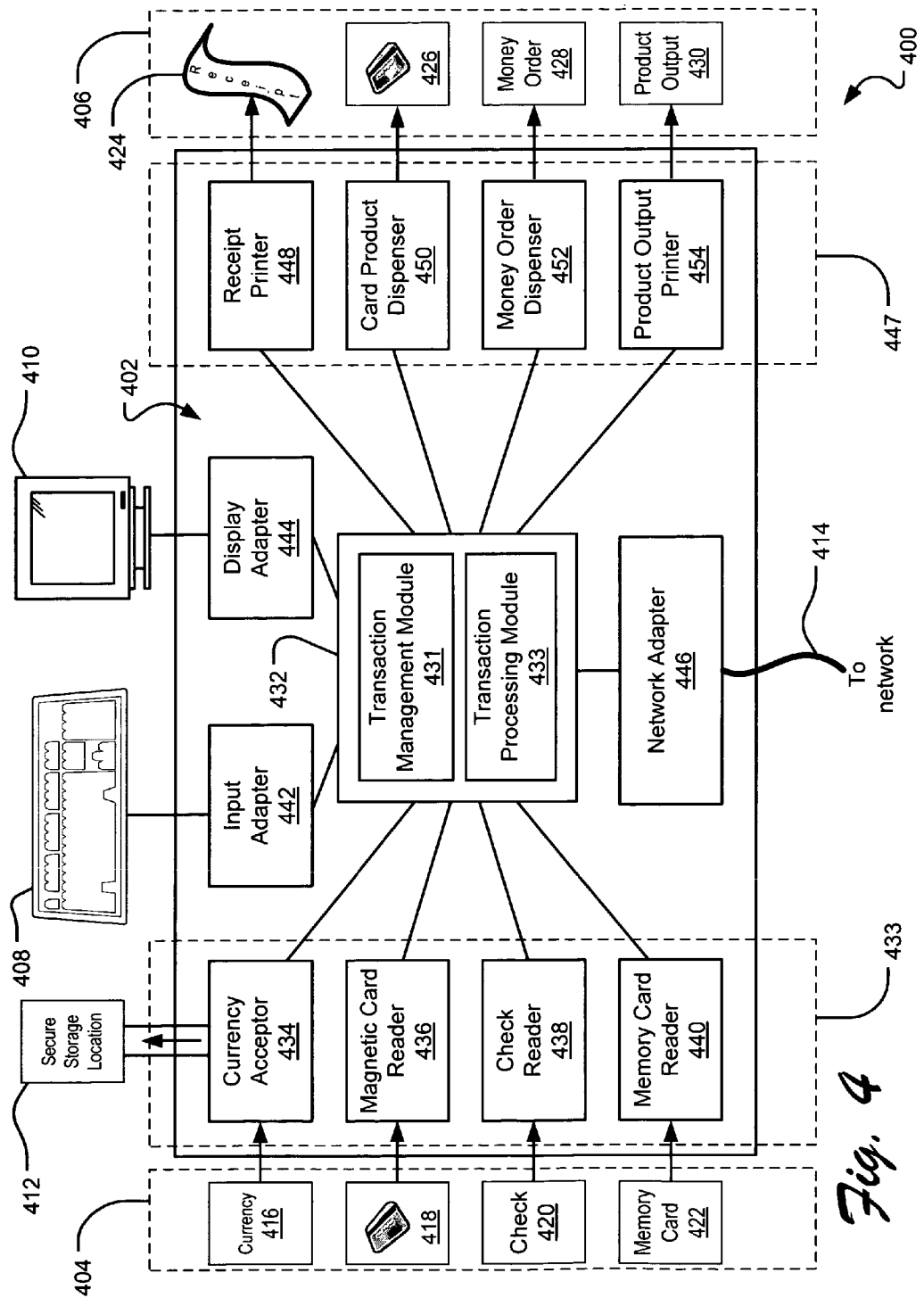

FIG. 4 schematically illustrates an exemplary electronic kiosk device.

Figure 5:
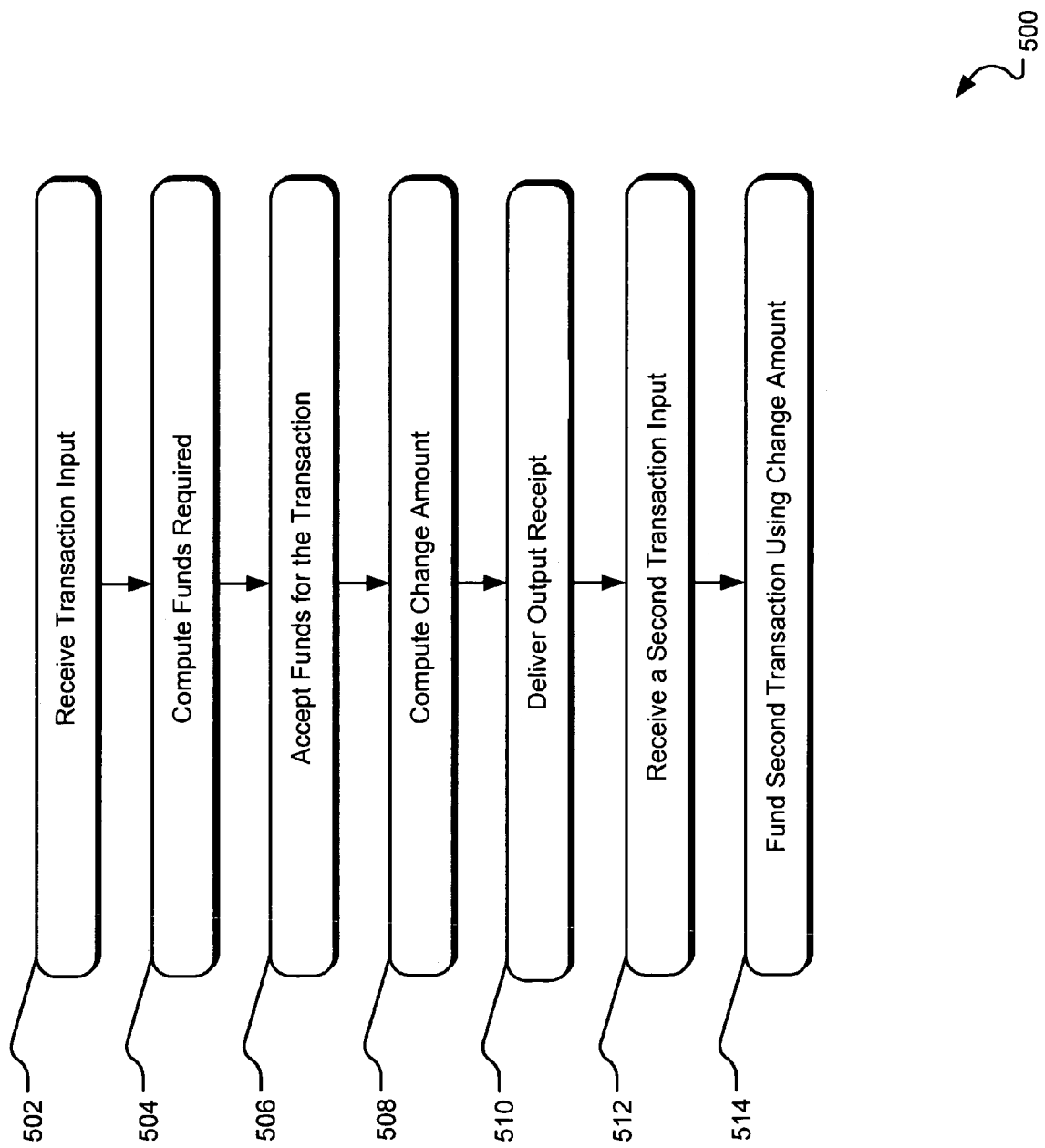

FIG. 5 illustrates exemplary operations for processing a change-based transaction associated with an electronic kiosk.

Figure 6:
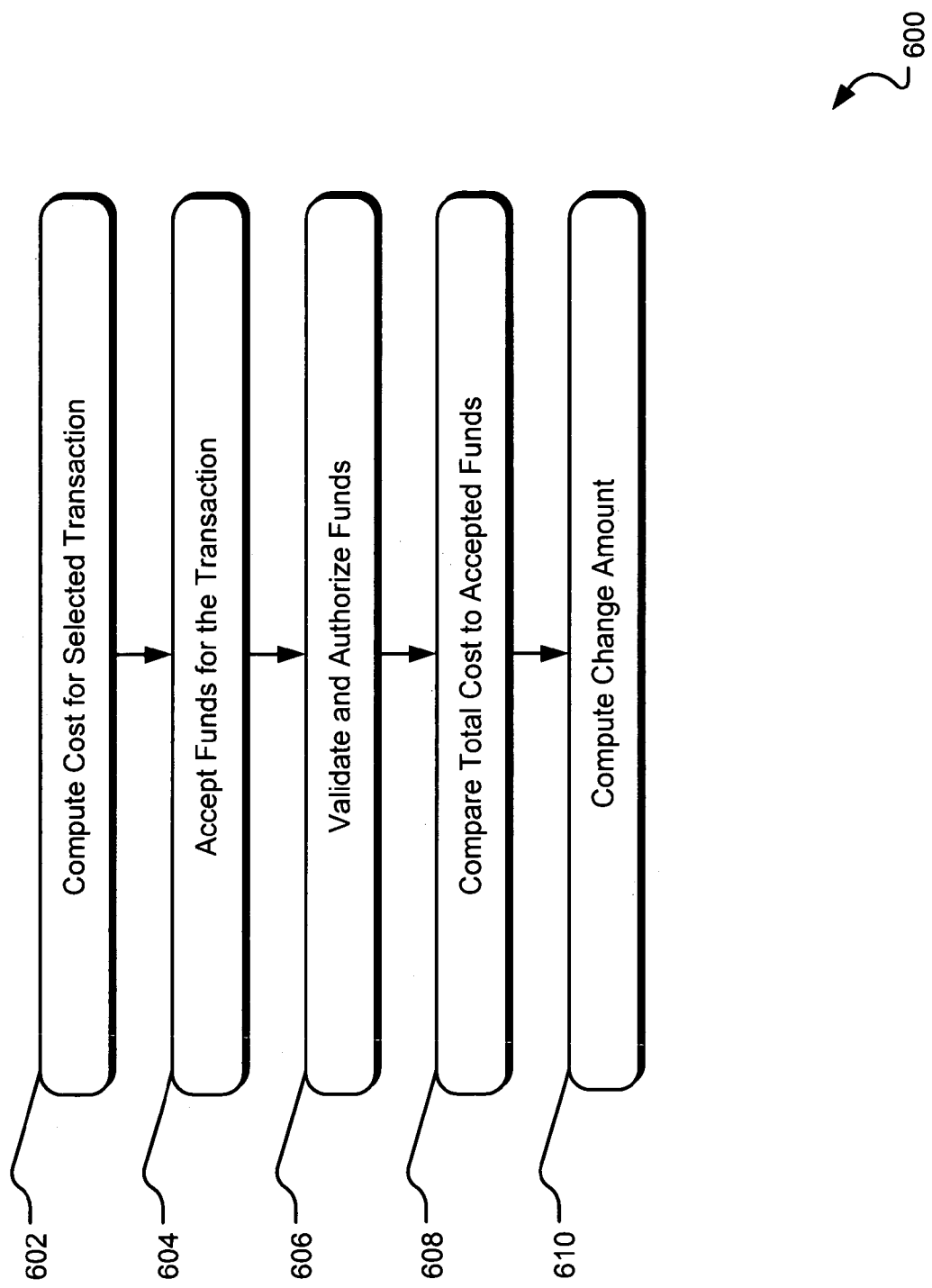

FIG. 6 illustrates an additional set of exemplary operations for processing a change-based transaction associated with an electronic kiosk.

Figure 7:
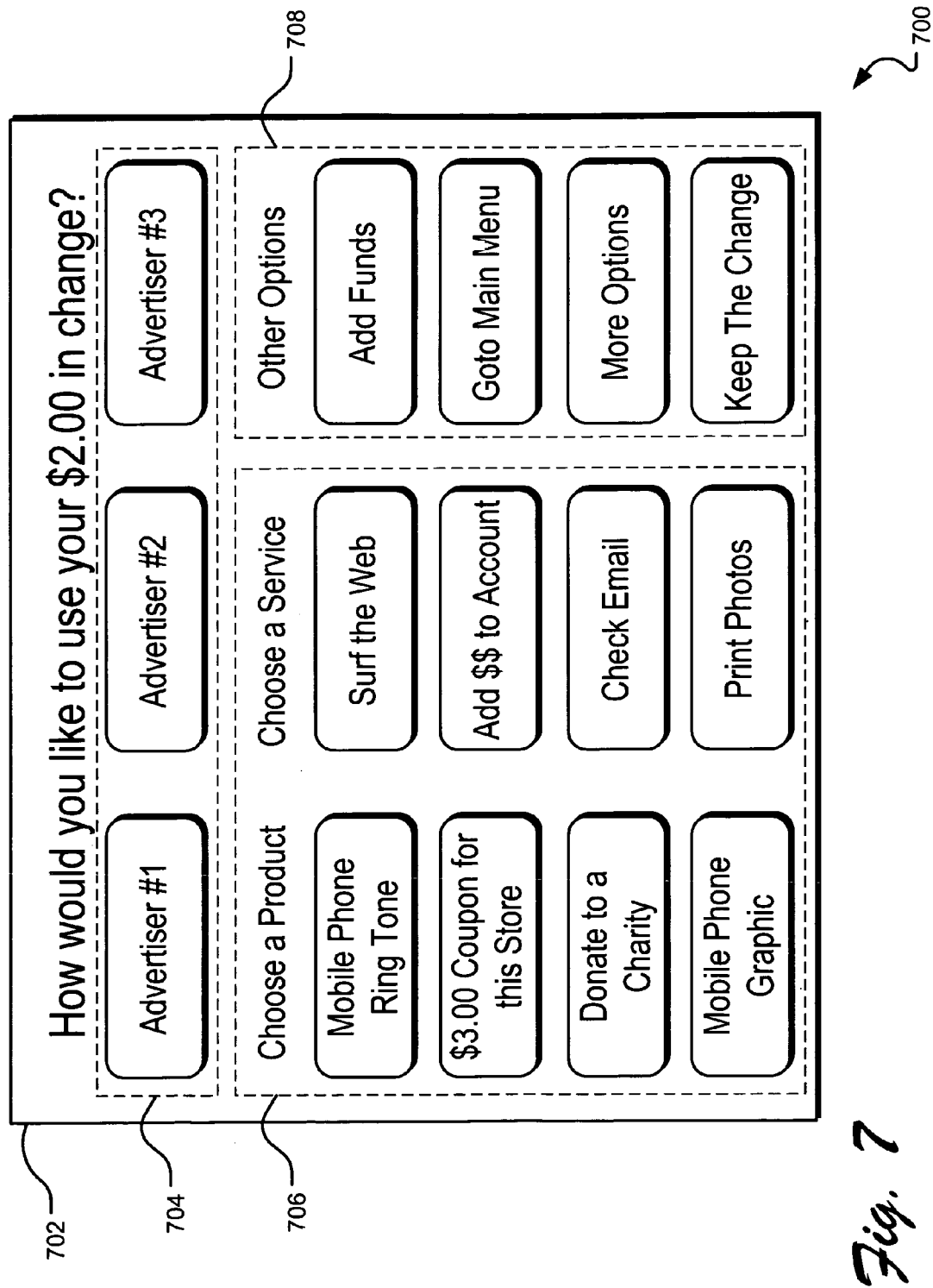

FIG. 7 illustrates a screenshot from a user interface of an exemplary electronic kiosk presenting secondary transactions to which a user can apply a change amount from a first transaction.

Figure 8:
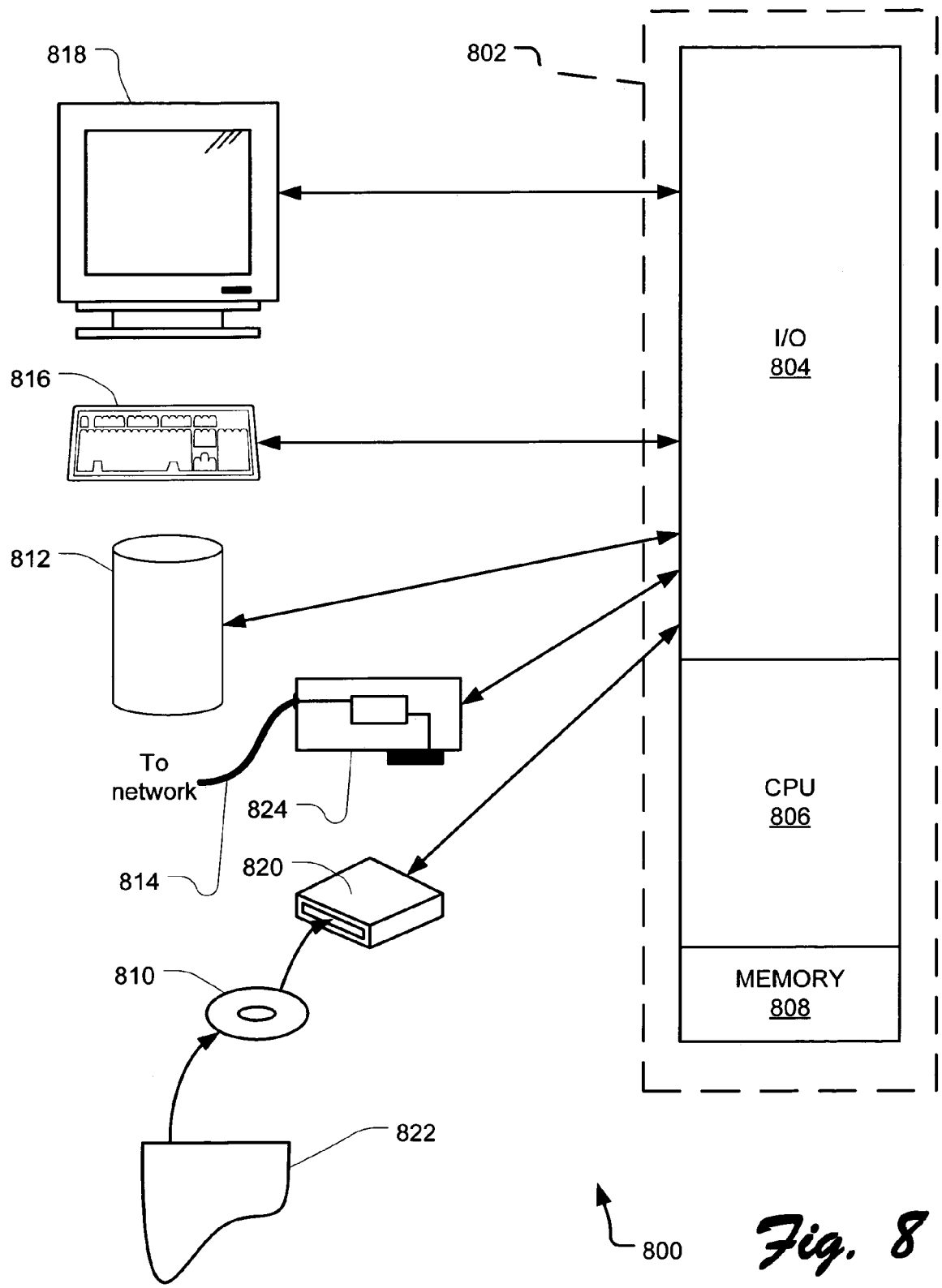

FIG. 8 illustrates an exemplary computing system that may be useful in implementing the described technology.

DETAILED DESCRIPTIONS

Electronic kiosks can provide a platform for a variety of vending services, communication services, and financial services. For example, a conveniently located kiosk (e.g., in a mall or convenience store) can vend tickets for sporting events, sell minutes for a prepaid phone card, and accept customer payments for utility bills. Integration of a variety of services into a convenient, user-friendly kiosk provides a "one-stop-shop" for consumers to quickly and easily complete a number of diverse and otherwise inconvenient tasks. Additionally, an aggregated-services electronic kiosk is further enhanced by linking individual transactions together and providing methods of using the change from a first transaction in a second transaction.

Figure 1:
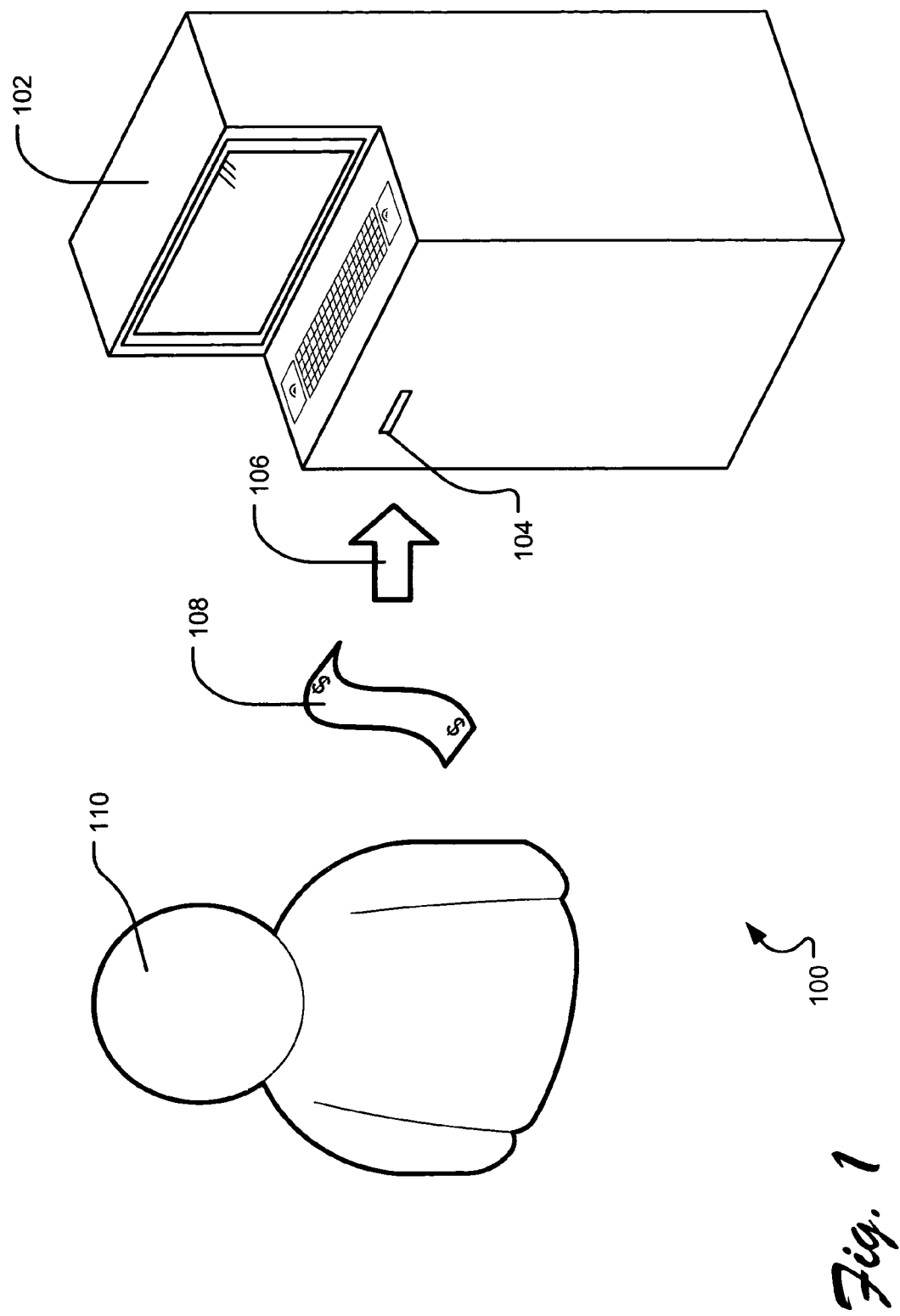
FIG. 1 illustrates a user interacting with an exemplary electronic kiosk.

FIG. 1 illustrates a user interacting with an exemplary electronic kiosk 100. An electronic kiosk 102 is shown having a display, a keyboard input, and trackball inputs. Alternate implementations can vary the structure and hardware components that make up an electronic kiosk. For example, in one implementation, a touch-screen is employed as an input device. In another implementation, a mouse is used as an input device. In yet another implementation, a trackball functions as an input device. The electronic kiosk 102 in FIG. 1 has a currency receiving device 104. A user 110 inserts currency 108 into the currency receiving device 104. The user 110 does not have to be an experienced kiosk user, nor is he or she required to be overly familiar with computers and/or electronic banking or other electronic transactions via a computer. The arrow 106 represents the direction in which the user 110 inserts the currency into the currency receiving device 104. Although not shown in FIG. 1, it should be appreciated that the electronic kiosk 102 can accept multiple sources of inputs and can output many different items as well. For example, the kiosk 102 can have a money order receiving device, a check receiving device, a credit card receiving device, etc. Furthermore, the kiosk 102 can print receipts, output tickets to sporting events, print coupons, output lottery tickets, etc.

Figure 2:
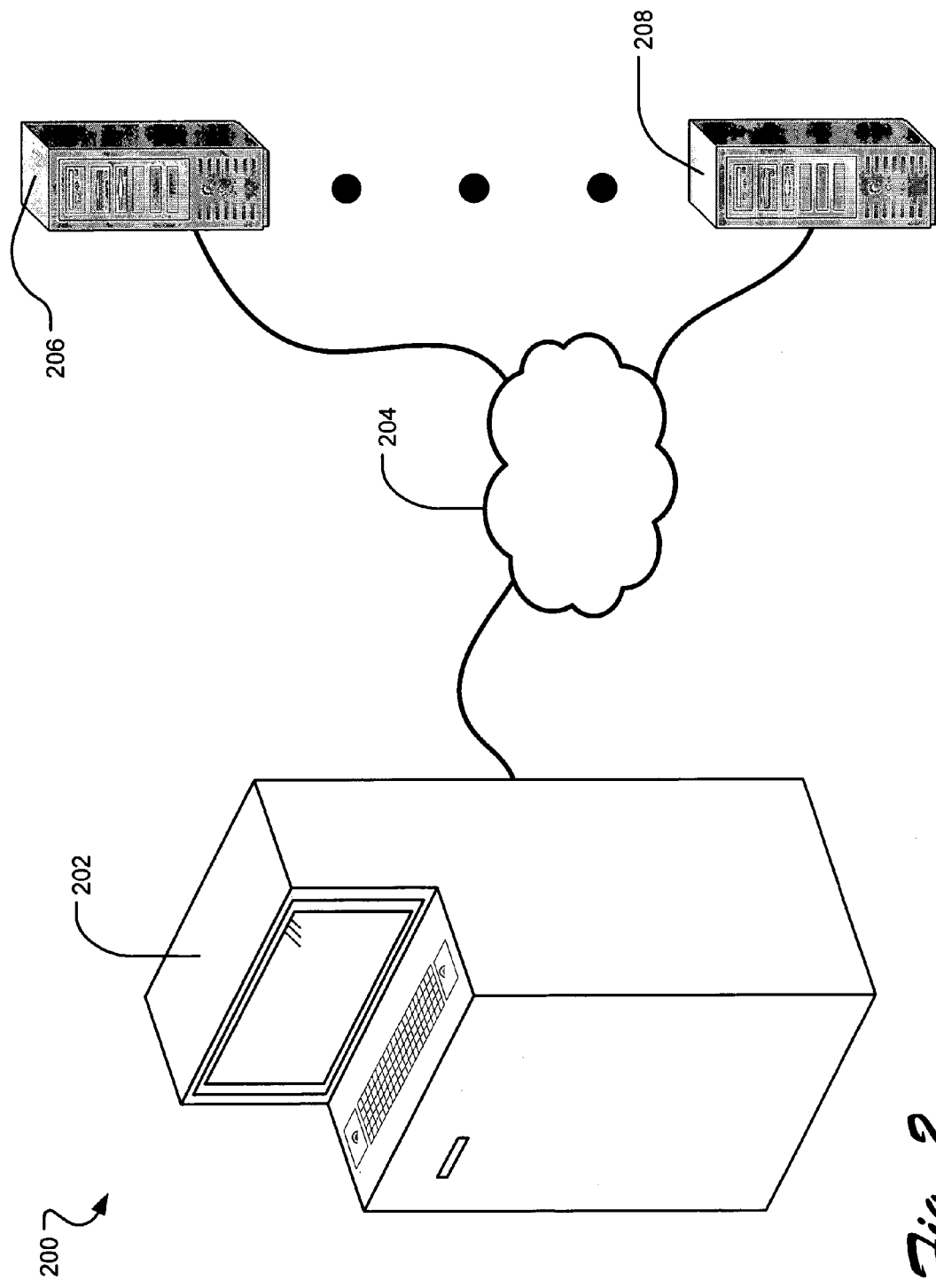
FIG. 2 illustrates an exemplary electronic kiosk system with a network connection to a variety of service computers.

FIG. 2 illustrates an exemplary electronic kiosk system with a network connection to a variety of service computers 200. The electronic kiosk 202 is connected to a network 204. In one implementation, the network 204 is the Internet. In another implementation, the network 204 is a Wide-Area-Network or WAN. In yet another implementation, each electronic kiosk 202 has a dedicated, secure connection to a network 204 that directly links the kiosk 202 to one or more servers 206-208. The servers 206-208 provide access to the services and products offered by the electronic kiosk 202. For example, server 206 is owned by the local electric utility company. The kiosk 202 uses the network 204 to communicate with the server 206 in order to authenticate the user and his or her account information associated with the electricity bill for this particular user. The kiosk 202 can also gather transaction process information from the server 206 in order to structure the and complete the transaction process. Difference servers or combinations of servers can provide the communications, computations, and data required to execute a transaction through the kiosk.

Figure 3:
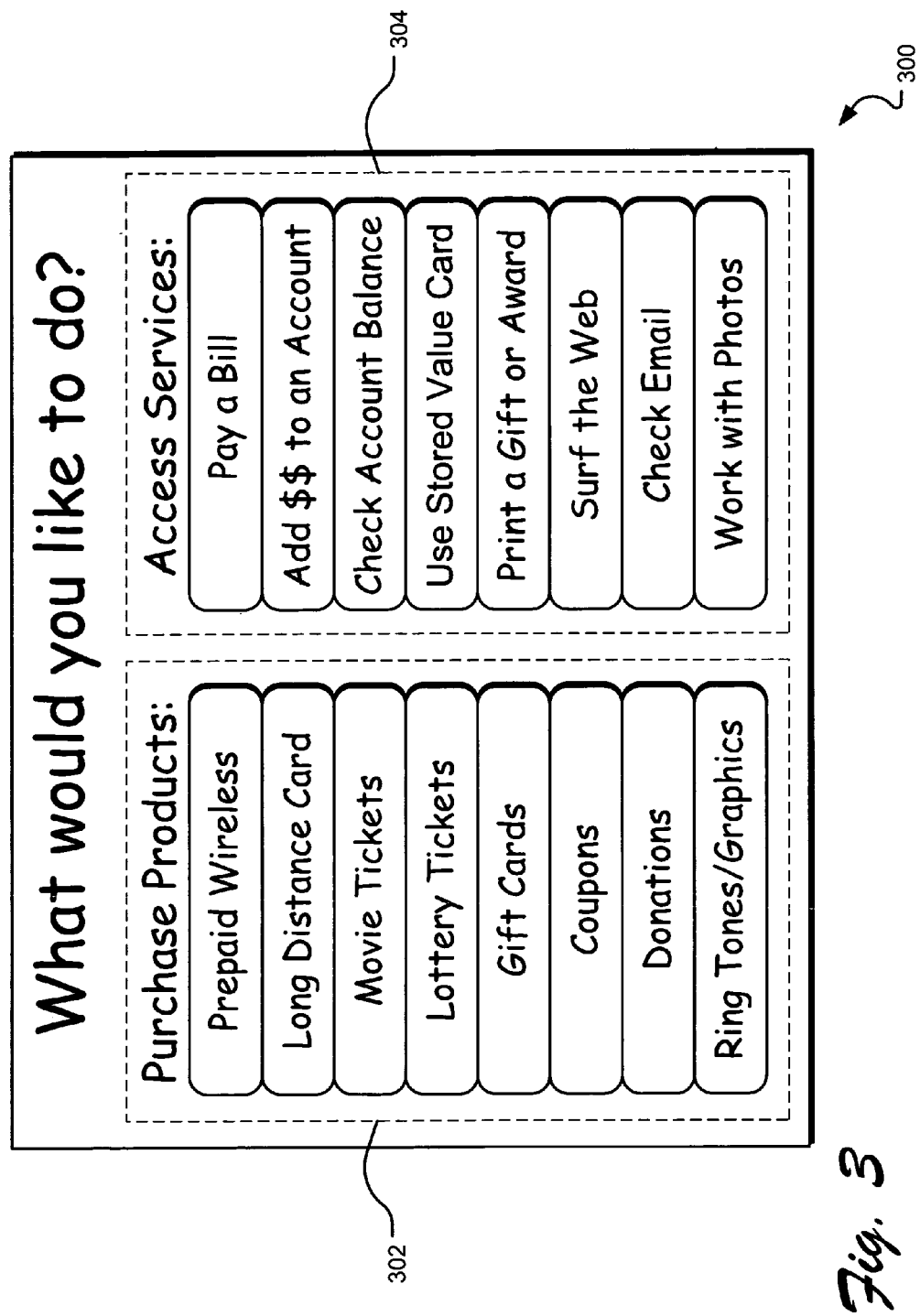
FIG. 3 illustrates a screenshot from a user interface of an exemplary electronic kiosk.

FIG. 3 illustrates a screenshot from a user interface of an exemplary electronic kiosk 300. In one implementation, the screenshot 300 depicted in FIG. 3 is the main "welcome" screen for the kiosk. In another implementation, a user is first presented with a language-selection dialog (e.g., "Please select your language: English, Spanish, Other"). In yet another implementation, the kiosk displays scrolling advertising or other fluctuating content on the main welcome screen. The screenshot 300 presents a user with the question, "What would you like to do?". The user is presented with a number of action buttons that can be arranged, for example, into two main categories. A user can either choose to purchase one of the products in the products list 302 or he or she can choose to access a service from the services list 320. Examples of products that the user can purchase may include, but are not limited to, prepaid wireless minutes, long distance calling cards, movie tickets, lottery tickets, gift cards, coupons, donations in fixed increments, and mobile phone ring tones or graphics. It should be noted that the above listing of offered products is for illustration only and does not include all possible products. Examples of services that the user can access may include, but are not limited to, "pay a bill", "add money to an account", "check account balance", "use stored value card", "print a gift or award", "surf the web", "check email", "charge a laptop computer, mobile phone, or other portable electronic device" and "work with photos". It should be noted that the above listing of offered services is for illustration only and does not include all possible services.

Additional user-interaction screens are contemplated allowing the display and selection of other products and/or services or more finely tailored subsets of products and services. For example, paid advertisements for specific products and services could be displayed based on known-user marketing characteristics. Prior transaction history or other preferences for a particular user could be stored and used to select the products and services that the particular user has shown past interest in purchasing. In an alternate implementation, advertising could be displayed based on other parameters, such as kiosk location, date, season, etc.

FIG. 4 schematically illustrates an exemplary electronic kiosk device 400. The schematic displays a number of internal components 402, exemplary inputs 404, exemplary outputs 406, an input device 408, a display device. 410, and a secure storage location 412. Furthermore, the kiosk has a network connection 414. The exemplary inputs 404 include currency 416 (e.g., cash), magnetic stripe cards 418 (e.g., credit cards), checks 420, and memory card devices 422 (e.g., Memory Stick, SD card, Compact Flash, etc.). Other inputs are contemplated. The exemplary outputs 406 include receipts 424, magnetic stripe cards (e.g., gift cards, stored value cards, customer loyalty cards, etc.) 426, money orders 428, and product or service outputs 430 (e.g., printed movie tickets, lottery tickets, coupons, etc.). Other outputs are contemplated. The input device 408 can be a keyboard, a mouse, a trackball, a touch screen, or any other input device or combination of input devices. The display device 410 can be a standard computer monitor, a flat-panel LCD display, a plasma display, etc. The secure storage location 412 can be a removable vault within the kiosk in which the input currency 416 is stored while awaiting retrieval. In another implementation, the secure storage location 412 can be permanently affixed to the kiosk. In yet another implementation, the secure storage location 412 can be used to securely store a checks, money orders, and other items in addition to cash. The network connection 414 connects the electronic kiosk to a network, thereby allowing the kiosk to connect to the products and services offered by the kiosk owner or other third-party product/service companies.

The internal components 402 are connected to a computer processing system 432. The components 402 can be categorized into three distinct groups. The first group of components 402 are input receivers 433, which can include a currency acceptor 434, a magnetic card reader 436, a check reader 438, and memory card readers 440. Additional input devices are contemplated such as a money order reader. The second group of components are adapters which can include an input adapter 442, a display adapter 444, and a network adapter 446. Other adapters are contemplated such as a sound card adapter. The third group of components are output devices 447, which can include a receipt printer 448, a card product dispenser 450, a money order dispenser 452, and a product output printer 454. Other output devices are contemplated such as a cashier's check printer.

Generally, input receivers 433 receive input from a user. For example, a user can insert currency 416 into a kiosk via the currency acceptor 434. In one implementation, the currency acceptor 434 can read paper bills, scan for counterfeit bills, reject questionable bills, return an unacceptable bill to a user, and basically perform any tasks associated with currency accepting devices. In another implementation, the currency acceptor 434 also accepts coins. In yet another implementation, the currency acceptor 434 can accept currency from two or more countries.

The magnetic card reader 436 accepts magnetic cards 418 such as credit cards (e.g., Mastercard, Visa, etc.), debit cards (e.g., ATM and check cards), and stored value cards. A stored value card (SVC) is similar to a debit card in that the SVC has an account associated with the card which can have funds added to and subtracted therefrom. An example of an SVC is a rechargeable merchant gift card—these cards are often purchased with an initial account balance and as the card is used to make purchases, the amounts of the purchases are deducted from the SVC's account. When the SVC account is depleted, a user can "recharge" the card by providing the merchant with additional funds which are then added to the SVC's account balance. A user can insert a magnetic card 418 and transfer funds from the card to the kiosk in order to be used for a transaction.

Another method for transferring funds to the kiosk is for the user to insert a check 420 into the check reader 438. The check reader 438 scans the check 420, locates appropriate bank routing and account numbers, and verifies that the check is drawn on a valid account containing sufficient funds. In one implementation, the check reader 438 scans the amount fields on the check 420. In another implementation, the user enters in the amount of the check 420. The check reader 438 can be configured to only accept certain types of checks (e.g., payroll checks, cashiers' checks, etc.). In yet another implementation, the kiosk communicates with other computers via the network 414 in order to verify the authenticity of a check and that sufficient funds are available in the associated checking account.

The memory card reader 440 accepts memory cards 422. Memory cards are relatively small electronic devices that store information. For example, many digital cameras and other hand-held consumer electronics utilize memory cards such as "memory sticks", "compact flash cards", "multimedia cards", "secure digital cards", "smartmedia flash cards", "USB flash drives", etc. Through the memory card reader 440, the user can upload digital photos and other personal files to the kiosk. Once the files have been uploaded a kiosk user can then utilize services on the kiosk (e.g., "work with photos", "check email", "surf the web", etc.) that can interact with those files. For example, using the "work with photos" service, a user can upload digital photographs from a USB flash drive, edit the photos and then have the kiosk create prints. In one implementation, the memory card reader 440 provides connections to allow a user to plug in external devices. The connections can be of any type, including, USB, Fire-Wire, parallel, serial, infrared, PCMCIA, Bluetooth, 802.xx wireless, etc.

The adapters assist the kiosk in interacting with the external world. For example, the input adapter 442 accepts input commands from a user. The input adapter 442 can interact with the user via a keyboard 408 or any other user input device (e.g., a mouse, trackball, touchscreen, voice recognition device, etc.). Furthermore, the input adapter 442 can allow for multiple input devices to be used concurrently (e.g., the user can browse the menu commands using a mouse and type in an entry using a keyboard).

The display adapter 444 provides a medium for displaying a user interface on a display device 410. The display device 410 can be any type of display device, including, a standard cathode ray tube (CRT) computer monitor, an LCD screen, a plasma screen, etc. Furthermore, the display device 410 can also incorporate input features, such as those associated with a touchscreen. The display device 410 further incorporate other types of output directed to a user. For example, the display device 410 can have speakers over which the kiosk is able to communicate to the user via voice response, tones, and other sounds. In one implementation, the display adapter 444 handles all the input and output communications with the display device 410. In another implementation, other adapter devices are used concurrently to support additional input and output communications with the display device 410.

The network adapter 446 allows the kiosk to communicate with other computing devices via a network 414. In one implementation, the network adapter 446 is attached to the public Internet. In another implementation, the attached network 414 is a private Wide-Area-Network or WAN. In yet another implementation, the kiosk has a dedicated, secure connection to a network 414 that directly links the kiosk to one or more servers.

Generally, the output devices 447 provide physical outputs to a user. For example, the receipt printer 448 prints a receipt for the user. In one implementation, a paper receipt is generated for each transaction. In another implementation, a receipt is generated only at the conclusion of all transactions by a single user. In yet another implementation, a user chooses to receive an email receipt instead of or in addition to the printed receipt.

The card product dispenser 450 outputs magnetic stripe cards 426 to a user. One example of an output card 426 is the stored value card (SVC) discussed above. The card product dispenser can encode information on the magnetic stripe of an SVC. In one implementation, the magnetic card reader 436 is physically distinct from the card product dispenser 450. In another implementation, a single device provides the functionalities of both the card reader 436 and the card product dispenser 450. Other types of information storage and transaction card devices are contemplated, including, "smartcards" that utilize a memory chip instead of a magnetic stripe, "wands" that utilize memory chips and wireless communication technologies such that no physical contact between the wand device and the reader is necessary, etc.

The money order dispenser 452 outputs money orders 428 to a user. The money order dispenser 452 can accept special print stock, allowing it to create money orders 428 with security-enhanced features. In one implementation, the money order dispenser 452 is dedicated to outputting only money orders 428. In an alternate implementation, the money order dispenser 452 is configured so that it can output other specialized print documents in addition to money orders 428.

The product output printer 454 prints product outputs 430. For example, the product output printer 454 can print movie theatre tickets or tickets to a baseball game. Additionally, the product output printer 454 can print any other type of output product including lottery tickets, coupons, donation certificates, gift awards, etc. In one implementation, the product output printer 454 does not print money orders. In another implementation, the product output printer can print money orders. In yet another implementation, the product output printer can print receipts, obviating the need for a distinct receipt printer 448.

The computer processing system 432 can be a general purpose computing system. The computer processing system 432 is connected to all of the internal components 402. In one implementation, the computer processing system has a processor having an input/output (I/O) section, a central processing section, and a memory section. There may be one or more processors, such that the processor of the computer system comprises a single central processing unit, or a plurality of processing units, commonly referred to as a parallel processing environment. The computer system may be a conventional computer, a distributed computer, or any other type of computer. The I/O section is connected to one or more adapters (e.g., an input adapter 442, a display adapter 444, a network adaptor 446, etc.), as well as a data storage unit such as a hard disk drive. Computer program products containing mechanisms to effectuate the systems and methods in accordance with the described technology may reside in the memory section, on a disk storage unit, on a DVD/CD-ROM medium connected to the computing system, or on a network storage location. Alternatively, a disk drive unit may be replaced or supplemented by a floppy drive unit, a tape drive unit, or other storage medium drive unit. See FIG. 8 for additional information concerning an exemplary computing system.

In one implementation, the computer processing system 432 facilitates the operation of two possible modules: the transaction management module 431 and the transaction processing module 433. The management module 431 selects a first and second transaction from the many possible transactions offered by an electronic kiosk. The transaction processing module 433 executes any selected transactions. In one implementation, the first transaction processed by the processing module 433 results in a change amount in the electronic kiosk. The processing module 433 then communicates the change amount to the computer process that executes the second transaction using the change amount to fund the second transaction.

FIG. 5 illustrates exemplary operations for processing a change-based transaction associated with an electronic kiosk 500. Each described operation can be performed by one or more computer processes of the electronic kiosk or connected transactions servers. The receive input operation 502 facilitates a user's selection of a product or service. In one implementation, the receive input operation 502 presents the user with a menu of possible choices. In another implementation, the receive input operation 502 creates a targeted menu based on records of a user's historical transactions. In yet another implementation, the receive input operation 502 tailors the menu of possible product and service selections based on parameters such as user profile information, location of kiosk, time/date/season of transaction, available advertisers, user marketing information, amount of funds deposited, etc. A user interacts with the kiosk and selects a particular product or service as the desired transaction.

The compute funds operation 504 analyzes the product or service selected by the user to determine the base amount to charge the user for the transaction. The compute funds operation 504 can incorporate user profile and/or kiosk location information to calculate additional charges such as taxes and fees, compute the total funds required, and display the results to the user. In one implementation, the compute funds operation 504 displays only the final total to the user. In another implementation, the compute funds operation 504 displays the final total as well as additional detail information concerning the funds required to complete the user-specified transaction.

The accept funds operation 506 prompts the user to insert funds into the kiosk. Depending on installed options and parameters for a given user profile and system information, the accept funds operation 506 displays the funding options available to the user, including, but not limited to, inserting cash; charging a credit card, debit card, check card, or SVC; inserting a check; inserting a money order; transferring funds electronically; initiating a bank wire transaction; etc. The accept funds operation 506 communicates with the input receivers to verify receipt of funds and prompts the user to insert additional funds if the amount already inserted is less than the final total of funds required.

The compute change operation 508 interacts with the user to finalize the transaction. In one implementation, the compute change operation 508 presents a summary of the transaction to the user and asks for authorization to complete the transaction. In another implementation, the compute change operation 508 accepts user authorization of the pending transaction, finalizes the transfer of funds, authorizes output of the product or service, and reports the completed transaction. In yet another implementation, the compute funds operation 508 processes the transaction and presents the user with the ability to undo the transaction at any time before exiting the current session or outputting the product or service.

The deliver receipt operation 510 communicates with the output devices to deliver a receipt for the transaction. Further, if the transaction involves delivery of a product via a card product dispenser, a money order dispenser, a product output printer, or any other output device, the deliver receipt operation 510 compels the appropriate output device to perform the output task. In one implementation, the receipt operation 510 prints a paper receipt. In another implementation, the receipt operation 510 emails an electronic receipt to the user. In yet another implementation, the receipt operation 510 stores all receipt information from the current transaction so that is can later be combined with other transaction information and a combined receipt can be produced.

The receive second input operation 512 facilitates a user's selection of a product or service. In one implementation, the receive operation 512 presents the user with a menu of possible products and services that can be purchased based on the change amount. The change amount can be communicated from the computer process that executed the first transaction. In alternative implementations, the receive operation 512 reads the change amount from a configuration file, a shared memory location, or other shared data store.

In one implementation, the receive operation 512 creates a targeted menu based on records of a user's historical transactions and the available change amount. In yet another implementation, the receive operation 512 tailors the menu of possible product and service selections based on parameters such as change amount, user profile information, location of kiosk, time/date/season of transaction, available advertisers, etc. The receive operation 512 communicates the second input from a user to the fund operation 514, which uses the change amount that remains from any overpayment of the first transaction to fund the second transaction. In one implementation, the fund operation 514 receives the fund amount from the computer process that executed the first transaction. In alternative implementations, the fund operation 514 can read the change amount from a configuration file, a shared memory location, or other shared data store.

In one implementation, the fund operation 514 uses only the change amount. In another implementation, the fund operation 514 allows the user to add additional funds to complete the transaction. In yet another implementation, the fund operation 514 accepts the change amount to fund the second transaction even though the amount of the second transaction exceeds the change amount.

In one implementation, the second transaction involves the exchange of a coupon for the change amount. The amount of the coupon can be greater than, less than, or equal to the change amount. Additionally, the fund operation 514 can accept additional funds to add to the change amount in order to execute the second transaction for a coupon with an amount greater than the change amount. In another implementation, the second transaction involves adding the change amount to a stored value card, credit card, debit card, etc. Additionally, the second transaction could involve adding the change amount to an account (such as a wireless phone account, utility account, etc.). In yet another implementation, the second transaction is executed even though the change amount, or the change amount plus additional funds, is less than the amount of the second transaction.

It is important to note that the above first and second transactions can be of two types. An amount-based transaction can occur wherein the product or service purchased in the transaction has a pre-defined amount associated therewith. For example, a $55 utility bill can be an amount-based transaction if the utility company will not accept an overpayment. If the utility company does accept an overpayment then the transaction is rightly classified as an account-based transaction. A payment of $60 can be applied in full to the account at the utility company, paying the $55 bill and having the remainder change amount of $5 applied to an account balance at the utility company for use against future bills. If the first transaction is an amount-based transaction and a change amount results, a user can specify that the change amount be applied to an account-based transaction, even if the associated product or service is already fully funded. It should be noted that the first transaction can be either account-based or amount-based and the second transaction can be either account-based or amount-based as well. The choice of transaction type for the second transaction can be independent of the choice of transaction type for the first transaction and vice-versa.

When a change amount remains after a first transaction, the system can present only those transactions for which the change amount is sufficient to complete the transaction. The user can then select from the resulting subset of possible transactions the transaction he or she wishes to execute as the second transaction. In another implementation, the system utilizes the user's transaction history to present only those transactions that the user has commonly chosen in the past as a second transaction. In yet another implementation, the system presents transactions that are chosen based on a determined geographic location for the kiosk when compared to nearby stores or other entities sponsoring the possible transactions. For example, suppose the location for a kiosk is determined and there is a convenience store nearby that has agreed to sponsor a coupon. The presented second transactions can include a coupon for the particular convenience store. The coupon can be for an amount less than, equal to, or greater than the change amount.

FIG. 6 illustrates an additional set of exemplary operations for processing a change-based transaction associated with an electronic kiosk 600. Each described operation can be performed by one or more computer processes of the electronic kiosk or connected transactions servers. The compute cost operation 602 determines the amount of the first selected transaction. The amount can include the value of the product or service associated with the transaction, taxes, fees, rebates, gift codes, discounts, etc.

The accept funds operation 604 allows the user to input funds through any of the input receivers or via any other method (such as a wire transfer, electronic funds transfer, etc.). The accept funds operation 604 can accept funds from multiple sources. The accepted funds can then be aggregated and made available as a total sum to be applied against one or more transactions.

The validate funds operation 606 examines the accepted funds and determines whether or not they are valid and authentic. For example, suppose a check is input by the user. The validate operation 606 would examine the check data, determine necessary detail information such as bank routing number and account number, and then communicate via a network connection in order to verify and authenticate the check.

The compare operation 608 compares the total validated and authenticated funds input by the user against the computed cost for the transaction. If the funds are less than the computed cost, the compare operation 608 gives the user the option to add additional funds. If the funds are equal to or greater than the computed cost, the compare operation 608 applies the funds to the computed cost of the transaction. The compute change operation 610 examines the results of the compare operation 608 and computes any remaining change amount. If the computed cost of the transaction matches the validated and authenticated funds, the computed change amount is zero. However, if the funds are greater than the computed cost of the transaction, then there is a positive change amount as computed by the compute change operation 610. The change amount is then communicated to the process selecting and/or executing the second transaction.

FIG. 7 illustrates a screenshot from a user interface of an exemplary electronic kiosk presenting options to which a user can apply change from a first transaction 700. In one implementation, the screenshot 700 depicted in FIG. 7 is presented by the receive second input operation 512. In another implementation, another operation displays the screenshot. The screenshot 700 presents a user with the question, "How would you like to use your $2.00 in change?". It should be understood that the change amount is not limited to $2.00, nor is it limited to whole dollar amounts. The change amount of $2.00 is only for illustrative purposes.

The user is presented with a number of action buttons, that in one example, can be broken down into three main categories. A user can select a product or service from the advertiser products or services list 704 or from the products and services list 706. The products or services in the advertiser list 704 can be selected based on advertiser parameters, user marketing profiles, location of the kiosk, etc. The products and services list 706 can be populated with a subset of available products and services based on user profile parameters, user transaction history, location of the kiosk, change amount being compared to the amount of the selected product or service, etc. Examples of products that the user can purchase include, but are not limited to, a mobile phone ring tone, a $3.00 coupon for a store nearby the kiosk (or a store actually hosting the kiosk), a donation certificate (e.g., a printed receipt showing that the change amount was gifted to a selected charity), and a mobile phone graphic. It should be noted that the above listing of offered products is for illustration only and does not include all the possible products.

Examples of services that the user can access include, but are not limited to, "surf the web", "add money to an account", "check email", and "print photos". By selecting one of the action buttons in the advertiser list 704 or the products and services list 706, the user is choosing to apply his or her change amount to the total purchase cost of the product or service associated with the selected button. In an alternate implementation, selecting an action button can redirect the user to an associated website or other order processing facility where the change amount will be displayed as a credit in the user's shopping cart.

The screenshot 700 also contains an other options list 708 containing additional action buttons. These buttons include "add funds" (which allows the user to augment the change amount by inserting additional funds) and "goto main menu" (which gives the user access to all available products and services as possible transactions in which to apply the change amount). Additional buttons are contemplated such as "keep the change".

FIG. 8 illustrates an exemplary system that may be useful in implementing the described technology. A general purpose computer system 800 is capable of executing a computer program product to execute a computer process. Data and program files may be input to the computer system 800, which reads the files and executes the programs therein. Some of the elements of a general purpose computer system 800 are shown in FIG. 8 wherein a processor 802 is shown having an input/output (I/O) section 804, a Central Processing Unit (CPU) 806, and a memory section 808. There may be one or more processors 802, such that the processor 802 of the computer system 800 comprises a single central-processing unit 806, or a plurality of processing units, commonly referred to as a parallel processing environment. The computer system 800 may be a conventional computer, a distributed computer, or any other type of computer. The described technology is optionally implemented in software devices loaded in memory 808, stored on a configured DVD/CD-ROM 810 or storage unit 812, and/or communicated via a wired or wireless network link 814 on a carrier signal, thereby transforming the computer system 800 in FIG. 8 into a special purpose machine for implementing the described operations.

The I/O section 804 is connected to one or more user-interface devices (e.g., a keyboard 816 and a display unit 818), a disk storage unit 812, and a disk drive unit 820. Generally, in contemporary systems, the disk drive unit 820 is a DVD/CD-ROM drive unit capable of reading the DVD/CD-ROM medium 810, which typically contains programs and data 822. Implementing the general purpose computer system 800 as part of an electronic kiosk can involve extensive use of the I/O section 804. The kiosk's input receivers (e.g., a currency acceptor, magnetic card reader, check reader, and memory card reader) can be connected to the I/O section 804. The kiosk's output devices (e.g., a receipt printer, card product dispenser, money order dispenser, and product output printer) can also be connected to the I/O section 804.

Computer program products containing mechanisms to effectuate the systems and methods in accordance with the described technology may reside in the memory section 808, on a disk storage unit 812, or on the DVD/CD-ROM medium 810 of such a system 800. Alternatively, a disk drive unit 820 may be replaced or supplemented by a floppy drive unit, a tape drive unit, or other storage medium drive unit. The network adapter 824 is capable of connecting the computer system to a network via the network link 814, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 800 is connected (by wired connection or wirelessly) to a local network through the network interface or adapter 824, which is one type of communications device. When used in a WAN-networking environment, the computer system 800 typically includes a modem, a network adapter, or any other type of communications device for establishing communications over the wide area network. In a networked environment, program modules depicted relative to the computer system 800 or portions thereof, may be stored in a remote memory storage device. It is appreciated that the network connections shown are exemplary and other means of and communications devices for establishing a communications link between the computers may be used.

In accordance with an implementation, software instructions and data directed toward implementing change-based transactions for an electronic kiosk and associated operations may reside on the disk storage unit 812, disk drive unit 820 or other storage medium units coupled to the system. Said software instructions may also be executed by CPU 806.

The technology described herein is implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understand that the described technology may be employed independent of a personal computer. Other embodiments are therefore contemplated.

What is claimed is:

1. A method for automated service comprising:
   selecting a first transaction from a plurality of account-based transactions simultaneously offered by an electronic kiosk;
   executing the first transaction via the electronic kiosk resulting in a change amount;
   selecting a subset of the plurality of account-based transactions based on account balances in one or more of a plurality of accounts and the change amount;
   selecting a second transaction from the subset of the plurality of account-based transactions offered by the electronic kiosk; and
   executing the second transaction via the electronic kiosk using the change amount to fund the second transaction.

2. The method of claim 1 further comprising:
   funding the first transaction with currency received and validated by the electronic kiosk.

3. The method of claim 1 wherein the operation of executing the second transaction is executed by a computer process and further comprising:
   communicating the change amount from the first transaction to the computer process that executes the second transaction.

4. The method of claim 1 wherein the operation of executing the second transaction comprises:
   accepting funds in addition to the change amount to fund the second transaction.

5. The method of claim 1 wherein the operation of selecting a second transaction comprises:
   receiving user input via the electronic kiosk specifying the second transaction from a plurality of transactions.

6. The method of claim 1 wherein the operation of selecting a second transaction comprises:
   presenting a subset of the plurality of transactions based on the change amount.

7. The method of claim 6 wherein the subset of transactions is selected according to whether the change amount is sufficient to fund each transaction in the subset of transactions.

8. The method of claim 6 wherein the subset of transactions is selected to include only account-based transactions that allow over-payment.

9. The method of claim 1 wherein the operation of selecting a second transaction comprises:
   selecting a subset of the plurality of transactions based on a user transaction history.

10. The method of claim 9 wherein the subset of transactions is selected according to common previously selected transactions in the user transaction history.

11. The method of claim 1 wherein the first transaction includes an amount-based transaction resulting in the change amount and the second transaction includes an account-based transaction.

12. The method of claim 11 wherein an amount-based transaction is a transaction with a pre-defined amount and a change amount results from an over payment of the pre-defined amount of the amount based-transaction.

13. The method of claim 11 wherein an account-based transaction is associated with an account and the account-based transaction has no pre-defined amount limit so that the change amount can be applied to the associated account.

14. The method of claim 1 wherein the first transaction includes an amount-based transaction resulting in the change amount and the second transaction includes an amount-based transaction.

15. The method of claim 1 wherein the first transaction includes an account-based transaction resulting in the change amount and the second transaction includes an account-based transaction.

16. The method of claim 1 wherein the first transaction includes an account-based transaction resulting in the change amount and the second transaction includes an amount-based transaction.

17. The method of claim 1 wherein the second transaction is executed at a discount using the change amount to fund the second transaction.

18. The method of claim 1 wherein the operation of selecting the second transaction comprises:
   detecting a location of the electronic kiosk; and
   presenting a subset of transactions from the plurality of transactions, wherein the subset of transactions is selected in relation to the location.

19. The method of claim 1 wherein the operation of executing the second transaction comprises:
   adding the change amount to a balance stored on a stored value card.

20. The method of claim 1 wherein the operation of executing the second transaction comprises:
   exchanging the change amount for a coupon having an amount.

21. The method of claim 20 wherein the amount of the coupon exceeds the change amount.

22. A system for automated service comprising:
   a transaction management module that selects a first from a plurality of account-based transactions simultaneously offered by an electronic kiosk;
   a transaction processing module that, using a processor, (1) executes the first transaction resulting in a change amount in the electronic kiosk, (2) selects a subset of the plurality of account-based transactions according to whether the change amount is sufficient to fund each transaction in the subset, (3) receives a selection of a second transaction from the subset of the plurality of account-based transactions, and (4) executes the second transaction using the change amount to fund the second transaction, wherein the subset of the plurality of account-based transactions are selected based on balances in one or more of the plurality of account-based transactions.

23. A computer program product for automated service encoding a computer program for a computer process that executes on a computer system, the computer process comprising:
   selecting a first transaction from a plurality of account-based transactions simultaneously offered by an electronic kiosk;
   executing the first transaction via the electronic kiosk resulting in a change amount;
   selecting a subset of the plurality of account-based transactions based on common previously selected transactions in a user transaction history, balances in one or more of a plurality of account-based accounts, and accounts that accept overpayment;
   selecting a second transaction from the plurality of account-based transactions offered by the electronic kiosk; and
   executing the second transaction via the electronic kiosk using the change amount to fund the second transaction.

\* \* \* \* \*